Sept. 29, 1964 H. BAUER 3,150,995

MAGNETIC RECORDING ELEMENT HAVING DIISOCYANATE-BASED ELASTOMER BINDER AND METHOD FOR PREPARING SAME

Filed April 28, 1961

INVENTOR.
HERBERT BAUER
BY
W.S. Hill
AGENT 3,150,995
Patented Sept. 29, 1964

3,150,995

MAGNETIC RECORDING ELEMENT HAVING DIISOCYANATE-BASED ELASTOMER BINDER AND METHOD FOR PREPARING SAME

Herbert Bauer, Metuchen, N.J., assignor to Radio Corporation of America, a corporation of Delaware Filed Apr. 28, 1961, Ser. No. 106,272
17 Claims. (Cl. 117—138.8)

This invention relates to an improved magnetic recording element of the type comprising a base having a coating of magnetic particles in a polymeric binder. The invention includes also novel methods for preparing the improved recording element.

A common type of magnetic recording element, which is also referred to as a magnetic tape, comprises a flexible base or tape having a surface coated with magnetic particles in a synthetic polymeric binder. A typical magnetic tape comprises a polyester base coated with acicular gamma iron oxide particles in a polyvinyl chloride binder. Such magnetic tape, when used in electronic data processing machines must withstand extreme mechanical abuse. In many data processing machines, the tape is moved at speeds of up to 150 inches per second with the coating in physical contact with stationary metal parts, such as tape guides and transducer heads. Due to this physical contact with the stationary metal parts, many of the presently used tape coatings are rapidly abraded. Some of the magnetic material which is abraded from the coating deposits in the equipment, adversely affecting its operation. Also, due to poor abrasion resistance, many of the presently used magnetic tapes start to show pin holes through the coating after relatively few passes through the machine.

An object of this invention is to provide an improved magnetic recording element.

A further object is to provide an improved magnetic recording tape which exhibits high resistance to abrasion and wear.

Another object is to provide methods for preparing the improved magnetic recording element of the invention.

In general, the magnetic recording element of the invention comprises a base, such as an oriented polyethylene terephthalate film, having a magnetic coating thereon comprising magnetic particles dispersed in an elastomer binder selected from a particular class of cross-linked diisocyanate-based compositions defined in detail below.

The coating of the improved recording element of the invention exhibits markedly better abrasion resistance than the coatings of previous recording elements. The coating disclosed herein is superior in abrasion resistance and tear strength to similar coatings comprising thermoplastic binders used in present commercial magnetic tapes, and also to similar coatings employing natural and synthetic rubber from unsaturates, such as butadiene, and from its various copolymers and modifications thereof, such as neoprene, GR–S, and the acrylic rubbers. The coatings disclosed herein are also superior in these aspects to similar coatings which employ linear soluble polyurethane elastomers and to polyurethane elastomers with randomly distributed cross-links formed from polyurethanes having incorporated triols or triisocyanates. In the recording element disclosed herein, the adhesion of the binder to the base is more than adequate to withstand the severe conditions encountered in data processing equipment, and the flexibility of the coating may be adjusted within wide limits by a proper selection of chain-extending agents and isocyanate-containing intermediates. These improvements are achieved with no degradation in the magnetic properties in the recording elements.

The elastomer binder used in the recording element of the invention may be produced in several steps. First, a polymeric organic compound having two terminal hydroxyl groups is reacted with a molar excess of an organic diisocyanate to produce an isocyanate-terminated prepolymer. This prepolymer may be treated in one of two ways. It may be reacted with a non-polymeric bifunctional compound in an amount insufficient to react with all of the free NCO groups. Or, it may be reacted with a non-polymeric bifunctional compound in an amount in excess of that required to react with all of the free NCO groups, and then further reacted with an organic diisocyanate in an amount sufficient to react with the excess of bifunctional compound. Subsequently, during the preparation of the coating, the reaction products are cross-linked or cured.

In the methods of the invention, magnetic particles are dispersed in a solution of one of the starting materials or of the products of one of the foregoing steps. Alternatively, any of the foregoing steps may be carried out in a solution in which magnetic particles are dispersed. Thus, each of the steps may be carried out by direct reaction or in solution, and the magnetic particles may be introduced in any step, provided the step is carried out in a solution. The mixture of magnetic particles in a solution of all of the elastomer ingredients in an uncured form is referred to as the coating mixture. To produce the recording element of the invention, the coating mixture is coated on a base and then dried. Then, the dry coating is heated at temperature between 40° and 170° C. until the coating is cured.

The invention is described in more detail in the following description in conjunction with the accompanying drawing in which.

Figure 1:
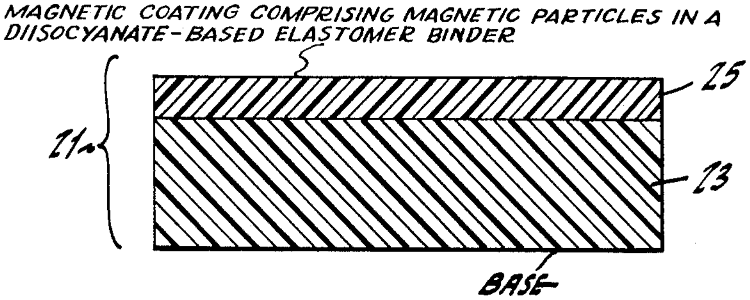
FIGURE 1 is a sectional view of a typical recording element of the invention.

A recording element 21 of the invention is illustrated in FIGURE 1. The recording element 21 comprises a base 23 and a coating 25 of the magnetic particles in a diisocyanate-based elastomer binder on a surface thereof.

The base 23 functions as a support for the entire structure. The particular base 23 is an oriented polyethylene terephthalate film. Some such films are marketed by the E. I. du Pont de Nemours and Co., Inc., Wilmington, Delaware, under the trademark Mylar. Other suitable bases are made of paper, cellulose acetate, and oriented polyvinyl chloride. The base 23 is typically 1.5 mils thick; although other thicknesses, preferably between 0.50 and 2.5 mils, may be used. The base 23 may be any width, for example, between 0.25 and 2.0 inches wide; and may be of any length, usually thousands of feet long.

Any of the usual magnetic particles may be used in the recording elements of the invention. For example, one may use metallic particles, such as iron particles; or oxidic particles, such as gamma iron oxide, magnetite, or a mixed ferrite, such as zinc ferrous ferrite. The preferred materials are of the oxidic type, are elongated or acicular in shape and are preferably between 0.2 and 2.0 microns long, 0.02 to 0.6 micron wide, and with an average length-to-width ratio between about 2 to 20, but usually about 6.

The binder for the coating 25 is a feature of the invention. There are few coating compositions and binders which satisfy all of the necessary requirements for use of the recording elements in electronic data processing equipment. For such use, the coating must be abrasion resistant, flexible, resilient, chemically stable, and strongly adherent to the base. The selections of the binder for the coating, and of the coating composition are usually made as a comprise among the foregoing requirements.

A wide variety of isocyanate-based polymeric materials can be made with mechanical and chemical properties which are adjustable over a wide spectrum. A small group of diisocyanate-based elastomers within this large class have been found which, in combination with magnetic particles, form coatings which satisfy the foregoing requirements. The diisocyanate-based elastomers used in magnetic recording elements of the invention consist essentially of units having the formula $$\left[ -NX-\left( B-NH-\overset{O}{\overset{\|}{C}}-O-G-O-\overset{O}{\overset{\|}{C}}-NH \right)_n -\left( B-NX-R \right)_m - \right]$$

wherein O—G—O is a bivalent, polymeric radical obtained by removing the terminal active hydrogen atoms from a polymeric organic compound having a molecular weight of at least 750 selected from the group consisting of : (1) polyalkyleneether glycols, (2) polyalkylene-aryleneether glycols, (3) polyalkyleneether-thioether-glycols, (4) polyalkylene-aryleneether-thioether-glycols, (5) linear, dihydroxy terminated polyesters, (6) linear, dihydroxy-terminated polyester amides; B is a bivalent, nonpolymeric organic radical which is inert to isocyanate groups. R is a bivalent radical consisting of carbonyl, nonpolymeric diacyl radicals and nonpolymeric carbamyl radicals. X is a hydrogen radical or a bivalent radical consisting of nonpolymeric dicarbamyl radicals and of polymeric dicarbamyl radicals where said polymeric dicarbamyl radicals consist essentially of units having the general formula:

$$-CO-NH-(B-NH-CO-O-G-O-CO-NH)_n-B-NH-CO-$$

B, and O—G—O and $n$ are the same as in the main chain defined above. X is preferably comprised of hydrogen and of polymeric carbamyl radicals of the type described in the molar ratio between 1 and 2000. And, $n$ and $m$ are integers, and the ratio $n/m$ is between 1 and 1000.

In the preparation of the isocyanate-based elastomers, which are useful in the recording elements of the invention, one or more of the polymeric organic compounds, from which the polymeric segment O—G—O is obtained, may be reacted with a molar excess of an organic diisocyanate $B(NCO)_2$ to form an isocyanate-terminated prepolymer. The prepolymer may then be chain-extended with a non-polymeric bifunctional compound such as water, a glycol or a diamine.

The polymeric organic compound has a higher molecular weight (molecular weight above 750) and two terminal hydroxyl groups and is selected form the group consisting of (1) polyalkylenether glycols, such as polytetramethyleneether glycol, polyethyleneether glycol, polypropyleneether glycol and poly-1,2-butyleneether, glycol, (2) polyalkylene-aryleneether glycols, (3) polyalkyleneether-thioether glycols, (4) polyalkylene-aryleneether-thioether glycols, (5) linear, dihydroxy terminated polyesters, such as are prepared in a known manner by esterification of dihydric alcohols, such as ethylene glycol, diethylene glycol, propylene glycol, 1,4-butylene glycol with dibasic organic acids such as adipic acid, glutaric acid, suberic acid, sebacic acid and 2-ethyl suberic acid, and (6) linear, dihydroxy-terminated polyester amides.

Any of a wide variety of organic diisocyanates may be used in the reaction including aromatic, aliphatic and cycloaliphatic diisocyanates and combinations of these types. Representative compounds include tolylene-2,4-diisocyanate, m-phenylene diisocyanate, 4-chloro-1,3-phenylene diisocyanate, 4,4'-biphenylene diisocyanate, 1,5-naphthalene diisocyanate, 1,6-hexamethylene diisocyanate, 1,4-cyclohexylene diisocyanate and 1,5-tetrahydronaphthalene diisocyanate.

The non-polymeric chain-extending agent which may be used in the preparation of the diisocyanate-based elastomer may be selected from the group of bifunctional compounds having at least two hydrogen atoms capable of reacting with isocyanates. Some suitable bifunctional compounds are water, ethylene glycol, hexamethylene glycol, monoethanolamine, m-phenylenediamine, 4,4'-methylene dianiline and 4,4'-methylene-bis-(2-chloroaniline).

The recording element of the invention is preferably prepared in three steps. First, a coating mixture is prepared. Then the coating mixture is coated on a base and dried. Finally the coating is cured.

A preferred method for preparing the coating mixture comprises dispersing thoroughly dried magnetic particles in a non-aqueous solution of an isocyanate-terminated prepolymer prepared in known manner by reacting higher molecular weight organic compounds which have two terminal hydroxyl groups with a molar excess of an organic diisocyanate to produce an isocyanate-terminated reaction product containing free NCO groups. Then, a bifunctional compound, such as a glycol, a diamine, an amino-alcohol, or water, is added to the dispersion in an amount insufficient to react with all of the free NCO groups to obtain the coating mixture.

Another method of the invention comprises dispersing magnetic particles in a non-aqueous solution of a chain-extended isocyanate material, such as prepared by reacting a higher molecular weight organic compound having two terminal hydroxyl groups with a molar excess of an organic diisocyanate, followed by chain extension of the isocyanate-terminated prepolymer by further reaction of the product with a molar excess of a bifunctional compound having two active hydrogen atoms such as a glycol, a diamine or water. Then, an organic isocyanate containing at least two isocyanate groups is added to the dispersion in an amount sufficient to react with the excess bifunctional compound to obtain the coating mixture.

A still further method of the invention comprises dispersing magnetic particles in a non-aqueous solution of a high molecular weight organic compound having two terminal hydroxyl groups. The high molecular weight organic compound of the dispersion is reacted with a molar excess of an organic diisocyanate. Then, a portion of chain extending agent less than the molar excess of the diisocyanate is added to produce the coating mixture.

A more detailed description of the chemistry and preparation of the elastomers of the type which are useful in the recording elements described herein appears in U.S. Patent 2,948,707 to Anthony F. Benning.

Figure 2:
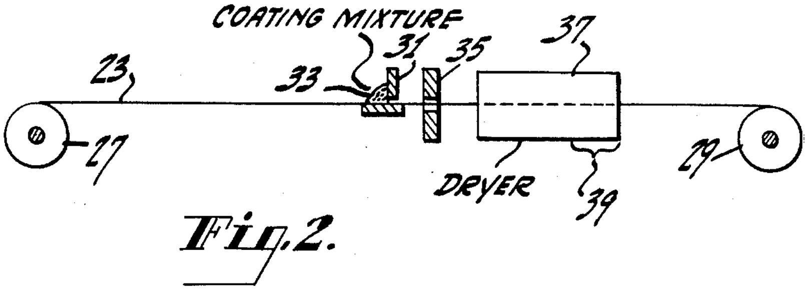
FIGURE 2 is a partially schematic, side view of an apparatus for carrying out the process of the invention and, FIGURE 3 is a partially-schematic, sectional view of an apparatus for testing the abrasion resistance of a magnetic coating.

The recording element 21 illustrated in FIGURE 1 may be prepared by the following process which is carried out in the continuous process apparatus of FIGURE 2. A base 23 of oriented polyethylene terephthalate film is provided in the form of a roll about 6 inches wide. The film is unwound from a feed roller 27 and passes, in order, through a coating station, an orienting station, a drying region, and a curing region, and then is wound on a take up roller 29. The film 23 passes through the apparatus at any convenient speed. Speeds between 10 and 200 feet per minute may be used.

At the coating station, the base 23 passes under a doctor blade or knife 31, which has a quantity of a coating mixture 33 behind it. The coating mixture 33 comprises a dispersion of magnetic particles in a non-aqueous solution of the isocyanate-based elastomer binder. The coating mixture 33 is applied to the surface of the base 23 to provide a dry coating between 0.1 and 2.0 mils thick, preferably about 0.5 mil thick. The coating mixture may be applied by any standard coating technique such as by dip coating, knife or doctor blade coating, transfer roll coating or gravure roll coating. Following application, the applied coating passes through a magnetic field to orient the magnetic particles therein in a desired direction. In the apparatus of FIGURE 2, the magnetic field is produced by two opposed magnets 35 above and below the base 23. These magnets produce a flat magnetic field parallel to the direction of travel of the base 23.

After orienting the magnetic particles, the coating is dried in a dryer 37 by evaporating the solvent therefrom. The dry structure is then heated for a short period. The heating is carried out in a curing region 39 near the exit end of the dryer 37. This final heating solidifies the coating sufficiently to permit the coated base to be wound on the take-up roller 29, without sticking or blocking. Following this short heating, the coated base is cooled to room temperature and then wound on the take-up roller 29. It may be desirable at this stage to heat the wound roll for extended periods of one hour to several days to temperatures of 40–120° C. to affect completion of the cross-linking reaction. The coated base may now be slit to any desired width. For purposes of this example, the slit width of the final product is 0.25 inch. All of the fabricating operations may be carried out in separate steps, combinations of steps, or in single series of continuous operations. Further, it may be desirable in some cases, to precoat or pretreat the surface of the base prior to coating.

Figure 3:
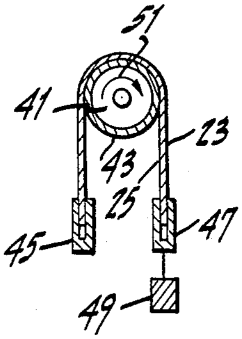

In order to compare the abrasion resistance of the coating with other coatings, the apparatus illustrated in FIGURE 3 is employed. The coating 25 of a strip of completed recording element 0.25 inch wide and several inches long, is placed around a drum 41 having an abrasive surface 43. One end of the strip is held in a fixed position by a first clamp 45. The other end of the strip is held freely by a second clamp 47 to which a weight 49 is attached. The drum 41 is rotated in the direction indicated by the arrow 51. The time required to abrade through the coating is noted and provides the comparative abrasion resistance value of the particular coating. The longer the time, the greater the abrasion resistance. The table at the end of the specification enumerates the comparative abrasion resistance of some magnetic tapes of the invention and of the prior art.

The following examples of recording elements of the invention may be prepared in the apparatus of FIGURE 2.

EXAMPLE 1

A coating mixture is prepared by first ball milling for 60 hours the following ingredients to produce a dispersion; 700 grams of acicular iron oxide such as IRN 110, marketed by C. K. Williams Co., Easton, Pa., 300 grams of a polyalkyleneether-isocyanate-based polymer, such as Adiprene L100 marketed by E. I. du Pont de Nemours and Co., Wilmington, Del., and 400 grams toluene. Then, add to this dispersion 24 grams of 4,4′-methylene dianiline dissolved in enough toluene to adjust the viscosity of the mixture to 1000 to 2000 cps. (centipoise) at room temperature. Coating should be carried out as soon as possible after the last ingredient is mixed into the dispersion.

A continuous base 23 of an oriented polyethylene terephthalate film 1.5 mils thick and 6 inches wide is moved at a speed of about 100 feet per minute through the apparatus of FIGURE 2. The coating mixture is applied by the doctor blade 31 and the wet coating is dried with forced air in the dryer 37 at about 90° C. Immediately after drying the coating, the base with the coating thereon is heated to about 120° C. to initiate curing and to solidify the coating and to remove the tackiness therefrom. The completed structure is then cooled to room temperature and wound on the take-up roller 29. Curing is completed by holding the completed structure for 6 hours at about 80° C. The results of the abrasion resistance test on the completely cured coating is shown in the table.

EXAMPLE 2

A coating mixture is prepared by first ball milling for 40 hours the following ingredients to produce a dispersion; 600 grams of an acicular magnetite, 200 grams of a polyalkyleneether-isocyanate-based polymer, such as Adiprene L100, 200 grams of a polyalkyleneether-isocyanate-based polymer, such as Adiprene L167, both marketed by E. I. du Pont de Nemours and Co., Wilmington, Del., and 380 grams of water-free methyl ethyl ketone. Then, add to this dispersion 16 grams 1,4-butanediol and 6 grams hexamethylene diamine in enough methyl ethyl ketone to adjust the viscosity of the mixture to 1000 to 2000 cps. at room temperature to produce a coating mixture. The coating mixture is coated and dried as in Example 1. Curing is initiated by heating briefly to 140° C. After winding the coated base on the takeup roller 29, curing is completed by holding the coating for about 8 hours at about 75° C.

EXAMPLE 3

A coating mixture is prepared by ball milling for 60 hours the following ingredients to produce a dispersion: 700 grams of an acicular zinc ferrous ferrite, 300 grams of the reaction product made by reaction of 1000 grams of an ethylene glycol-adipic acid polyester having a hydroxyl number of 56 with 180 grams 1,5-naphthylene diisocyanate and 450 grams tetrahydrofuran. Then, add to this dispersion 33 grams 4,4′-methylenebis-(2-chloroaniline) dissolved in enough tetrahydrofuran to adjust the viscosity of the coating mixture to 1000–2000 cps. at room temperature. The coating mixture is coated and dried as in Example 1. Curing is initiated by heating briefly to 140° C. After winding the coated base on the takeup roller 29, curing is completed by holding the coating for about 8 hours at about 75° C.

EXAMPLE 4

A coating mixture is prepared by ball milling for 30 hours the following ingredients to produce a dispersion: 700 grams of an acicular iron oxide such as IRN 110, marketed by C. K. Williams and Co., Easton, Pa., 250 grams of an ethylene glycol-adipic acid polyester having a hydroxyl number of 56 and 430 grams tetrahydrofuran. Add to the dispersion 50 grams tolylene-2,4-diisocyanate, and heat the mixture for 2 hours to 100° C. Then, add 24 grams 4,4′-methylene dianiline dissolved in enough tetrahydrofuran to adjust the viscosity of the coating mixture to 1000–2000 cps. at room temperature. The coating mixture is coated and dried as in Example 1. Curing is initiated by heating briefly to 140° C. After winding the coated base on the takeup roller 29, curing is completed by holding the coating for about 8 hours at about 75° C.

*Table*

ABRASION RESISTANCE OF GAMMA IRON OXIDE-BINDER COATINGS [1]

| Binder | Example | Abrasion Resistance (seconds) |
|---|---|---|
| Diisocyanate-based Elastomer | 1 | >600. |
| Do | 2 | >600. |
| Do | 3 | >600. |
| Do | 4 | >600. |
| Linear Polyurethane Elastomer | | 400. |
| Polyvinyl chloride-acetate Copolymer | | 10 to 60. |

[1] All coatings about 0.5 mil thick.

What is claimed is:

1. A magnetic recording element comprising a base and a coating upon a surface of said base, said coating comprising magnetic particles in a diisocyanate-based elastomer binder, said diisocyanate-based elastomer consisting essentially of interconnected units having the formula:

$$\left[-NX-\left(B-NH-\overset{\overset{O}{\|}}{C}-O-G-O-\overset{\overset{O}{\|}}{C}-NH\right)_n-\left(B-NX-R\right)_m-\right]$$

wherein O—G—O is a bivalent, polymeric radical obtained by removing the terminal active hydrogen atoms from an organic compound having a molecular weight of at least 750 selected from the group consisting of: (1) polyalkyleneether glycols, (2) polyalkylene-aryleneether glycols, (3) polyalkyleneether-thioether glycols, (4) polyalkylene-aryleneether-thioether glycols, (5) linear, dihydroxy-terminated polyesters, (6) linear, dihydroxy-terminated polyester amides; B is a bivalent, non-polymeric, organic radical which is inert to isocyanate groups and which is selected from the group consisting of aromatic, aliphatic, and cycloaliphatic radicals, and combinations thereof; R is a bivalent radical selected from the group consisting of carbonyl, non-polymeric diacyl radicals and non-polymeric dicarbamyl radicals; X is at least one radical selected from the group consisting of hydrogen radical and bivalent radicals consisting of non-polymeric dicarbamyl radicals and of polymeric dicarbamyl radicals where said polymeric dicarbamyl radicals consist essentially of units having the general formula:

$$-\overset{\overset{O}{\|}}{C}-NH-\left(B-NH-\overset{\overset{O}{\|}}{C}-O-G-O-\overset{\overset{O}{\|}}{C}-NH\right)_n-B-NH-\overset{\overset{O}{\|}}{C}-$$

and where $n$ and $m$ are integers and the ratio of $n/m$ is between 1 and 1000.

2. The recording element of claim 1 wherein the magnetic particles consist essentially of acicular magnetic particles of the oxidic type between 0.2 and 2.0 microns long with an average length-to-width ratio of about 2 to 20.

3. The recording element of claim 2 wherein the magnetic particles are gamma iron oxide.

4. The recording element of claim 2 wherein said base is a polyester base and wherein the bivalent non-polymeric organic radical B is a 2,4-tolylene radical.

5. The recording element of claim 2 wherein the bivalent, polymeric radical is obtained by removing the terminal active hydrogen atoms from a polyalkyleneether glycol having a molecular weight of at least 750.

6. The recording element of claim 5 wherein the polyalkyleneether glycol is a polytetramethyleneether glycol.

7. The recording element of claim 2 wherein the bivalent, polymeric radical O—G—O is obtained by removing the terminal active hydrogen atoms from a linear, dihydroxy-terminated polyester having a molecular weight of at least 750.

8. The recording element of claim 7 wherein the linear, dihydroxy-terminated polyester is a polyethylene adipate.

9. The recording element of claim 2 wherein the bivalent radical R is a non-polymeric dicarbamyl radical.

10. The recording element of claim 9 where the non-polymeric dicarbamyl radical is a 4,4′-methylene-bis-(phenylcarbamyl) radical.

11. The recording element of claim 2 wherein X consists of hydrogen radicals and of bivalent polymeric dicarbamyl radicals of the formula $$-CO-NH-(B-NH-CO-O-G-O-CO-NH)_n-B-NH-CO-$$

and the molar ratio of hydrogen to said bivalent polymeric dicarbamyl radical is between 1 and 2000.

12. The recording element of claim 11 where the ratio of hydrogen to said bivalent polymeric dicarbamyl radicals is approximately 1.

13. A method for preparing a magnetic recording element comprising dispersing magnetic particles in a non-aqueous solution of an isocyanate-terminated prepolymer having the formula:

$$OCN—(B—NH—CO—O—G—O—CO—NH—B)_n—NCO$$

wherein O—G—O is a bivalent, polymeric radical obtained by removing the terminal active hydrogen atoms from an organic compound having a molecular weight of at least 750 selected from the group consisting of: (1) polyalkyleneether glycols, (2) polyalkylene-aryleneether glycols, (3) polyalkyleneether-thioether glycols, (4) polyalkylene-aryleneether-thioether glycols, (5) linear, dihydroxy-terminated polyesters, and (6) linear, dihydroxy-terminated polyester amides; B is a bivalent, non-polymeric, organic radical which is inert to isocyanate groups and which is selected from the group consisting of aromatic, aliphatic, and cycloaliphatic radicals, and combinations thereof, and $n$ is an integer between 1 and 100, adding to said dispersion a non-polymeric bifunctional compound selected from the group consisting of glycols, diamines, amino-alcohols, and water in an amount insufficient to react with all of the free NCO groups of said prepolymer to produce a coating mixture, coating said coating mixture upon a base, drying said coating, and then heating said coating at temperatures between 40° and 170° C. until said coating is cured.

14. A method for preparing a magnetic recording element comprising dispersing magnetic particles in a non-aqueous solution of an isocyanate-terminated prepolymer having the formula:

$$OCN—(B—NH—CO—O—G—O—CO—NH—B)_n—NCO$$

wherein O—G—O is a bivalent, polymeric radical obtained by removing the terminal active hydrogen atoms from an organic compound having a molecular weight of at least 750 selected from the group consisting of: (1) polyalkyleneether glycols, (2) polyalkylene-aryleneether glycols, (3) polyalkyleneether-thioether glycols, (4) polyalkylene-aryleneether-thioether glycols, (5) linear, dihydroxy-terminated polyesters, and (6) linear, dihydroxy-terminated polyester amides; B is a bivalent, non-polymeric, organic radical which is inert to isocyanate groups and which is selected from the group consisting of aromatic, aliphatic, and cycloaliphatic radicals, and combinations thereof, and $n$ is an integer between 1 and 100, adding to said dispersion a non-polymeric bifunctional compound selected from the group consisting of glycols, diamines, amino-alcohols, and water in an amount in excess of that required to react with all of the free NCO groups, then adding a quantity of diisocyanate containing free NCO groups in an amount sufficient to react with the excess of bifunctional compound to produce a coating mixture, coating said coating mixture upon a base, drying said coating, and then heating said coating at temperatures between 40° and 170° C. until said coating is cured.

15. A method for preparing a magnetic recording element comprising reacting an isocyanate-terminated prepolymer having the formula:

$$OCN—(B—NH—CO—O—G—O—CO—NH—B)_n—NCO$$

wherein O—G—O is a bivalent, polymeric radical obtained by removing the terminal active hydrogen atoms from an organic compound having a molecular weight of at least 750 selected from the group consisting of: (1) polyalkyleneether glycols, (2) polyalkylene-aryleneether glycols, (3) polyalkyleneether-thioether glycols, (4) polyalkylene-aryleneether-thioether glycols, (5) linear, dihydroxy-terminated polyesters, and (6) linear, dihydroxy-terminated polyester amides; B is a bivalent, non-polymeric, organic radical which is inert to isocyanate groups and which is selected from the group consisting of aromatic, aliphatic, and cycloaliphatic radicals, and combinations thereof, and $n$ is an integer between 1 and 100, with an amount of non-polymeric bifunctional compound selected from the group consisting of glycols, diamines, amino-alcohols, and water in excess of that required to react with all of the free NCO groups, forming a solution of the product of said reaction, dispersing magnetic particles in said solution, adding a quantity of a non-polymeric diisocyanate in an amount sufficient to react with the excess of bifunctional compound to produce a coating mixture, coating said coating mixture upon a base, drying said coating, and then heating said coating at temperatures between 40° and 170° C. until said coating is cured.

16. A method for preparing a magnetic recording element comprising dispersing magnetic particles in a non-aqueous solution of a polymeric organic compound having two terminal hydroxyl groups and a molecular weight of at least 750 selected from the group consisting of: (1) polyalkyleneether glycols, (2) polyalkylene-aryleneether glycols, and (3) linear, dihydroxy-terminated polyesters, reacting said organic compound with a molar excess of an organic diisocyanate to produce an isocyanate-terminated prepolymer, adding a non-polymeric bifunctional compound selected from the group consisting of glycols, diamines, amino-alcohols, and water in an amount insufficient to react with all of the free NCO groups of said prepolymer to produce a coating mixture, coating said coating mixture upon a base, drying said coating, and then heating said coating at temperatures between 40 and 170° C. until said coating is cured.

17. A method for preparing a magnetic recording element comprising dispersing magnetic particles in a non-aqueous solution of a polymeric organic compound having two terminal hydroxyl groups and a molecular weight of at least 750 selected from the group consisting of: (1)

polyalkyleneether glycols, (2) polyalkylene-aryleneether glycols, and (3) linear, dihydroxy-terminated polyesters, reacting said organic compound with a molar excess of an organic diisocyanate to produce an isocyanate-terminated prepolymer, adding a non-polymeric bifunctional compound selected from the group consisting of glycols, diamines, amino-alcohols, and water in an amount in excess of that required to react with all of the free NCO groups of said prepolymer, adding a quantity of a non-polymeric diisocyanate in an amount sufficient to react with the excess bifunctional compound to produce a coating mixture, coating said coating mixture upon a base, drying said coating, and then heating said coating at temperatures between 40° and 170° C. until said coating is cured.

References Cited in the file of this patent

UNITED STATES PATENTS

| | | |
|---|---|---|
| 2,948,707 | Benning | Aug. 9, 1960 |
| 2,978,414 | Harz et al. | Apr. 4, 1961 |
| 2,989,415 | Horton et al. | June 20, 1961 |
| 3,049,442 | Haines et al. | Aug. 14, 1962 |

FOREIGN PATENTS

| | | |
|---|---|---|
| 585,378 | Canada | Oct. 20, 1959 |
| 717,537 | Great Britain | Oct. 27, 1954 |
| 814,225 | Germany | Sept. 20, 1951 |